United States Patent [19]

Rabinovich

[11] Patent Number: 4,470,437

[45] Date of Patent: Sep. 11, 1984

[54] EMERGENCY DRAIN DEVICE

[75] Inventor: Evsey Rabinovich, Erie, Pa.

[73] Assignee: Emco Wheaton, Inc., Conneaut, Ohio

[21] Appl. No.: 371,238

[22] Filed: Apr. 23, 1982

[51] Int. Cl.³ .............................................. B65B 31/06
[52] U.S. Cl. ......................................... 141/4; 141/66;
 141/98; 141/326; 141/302; 137/320; 138/89;
 220/85 F; 220/281; 220/352; 222/91; 285/158
[58] Field of Search ...................................... 141/1–12,
 141/37–66, 98, 285–310, 325–327; 137/320, 68,
 588; 220/85 F, 281, 352; 138/89; 222/91, 481,
 488; 285/158, 177

[56] References Cited

U.S. PATENT DOCUMENTS 298,686  5/1884  Gardner .............................. 137/320

Primary Examiner—Houston S. Bell, Jr.
Attorney, Agent, or Firm—Pearne, Gordon, Sessions, McCoy, Granger & Tilberry

[57] ABSTRACT

A device for attachment to a tank in the event of an emergency requiring drainage of the tank. The device is adapted to be coupled to a strategically located port on the tank and upon coupling therewith automatically ejects a plug to establish an outflow circuit from the tank. The device includes a flow limiting feature which is calibrated to avoid the buildup of an excessive vacuum in the tank, provisions to introduce an inert replacement gas into the tank, and structure to limit the pressure of the replacement gas.

10 Claims, 4 Drawing Figures

EMERGENCY DRAIN DEVICE

BACKGROUND OF THE INVENTION

The invention relates to safety appliances, and more particularly pertains to a device for draining a tank of hazardous fluid in an emergency.

In the handling, transit, storage and use of hazardous fluid materials contained in tanks, an emergency may arise making it necessary or prudent to evacuate the tank even though the normal discharge apparatus is incapacitated, inaccessible or otherwise unavailable. In particular, over-the-road transport of potentially hazardous fluids such as gasoline in tank trucks may result in such an emergency. When a mishap occurs leaving a tank truck overturned, for example, it is an accepted safety practice to first drain the tank before other salvage operations are attempted. Where normal discharge apparatus has been disabled by damage or inverted orientation or made inaccessible by surrounding obstacles, one prior manner of draining the tank was to drill a hole with special equipment at an appropriate point in the tank and then draw off the hazardous fluid through a suction line. This procedure involved a degree of risk because possible sparks and overheating of the drill could result in an explosion or ignition of the product carried in the tank. Furthermore, the special equipment necessary to perform this procedure is relatively expensive and as a result is often not immediately available at an accident site.

Another prior procedure to evacuate an overturned tank truck involves special apparatus which is assembled over the manhole weld collar on the tank. The apparatus incorporates rubber gloves through which the manhole can be operated for access and draining of the tank through the manhole and the apparatus. Problems of leakage with the seal between the apparatus and the manhole structure are often encountered. These leakage problems cannot be readily avoided because of variations in shape and size of the manhole weld collars and other structural elements of the manholes. Another problem with known emergency evacuation techniques such as those involving access through a manhole is that there is ordinarily no provision for controlling or limiting the vacuum developed in a tank as it is evacuated of product. Excessive vacuum buildup inside a tank can result in its collapse and such damage can readily exceed that which might have occurred in the original mishap.

SUMMARY OF THE INVENTION

The invention provides an emergency device adapted to be fitted to a tank at the time it is desired to evacuate it. The device is particularly suited for use in an emergency draining of tank trucks and the like. In accordance with the invention, a tank or like vessel is provided during manufacture or a simple retrofit operation, with one or more strategically located ports. A port, in the illustrated embodiment, is a boss welded or otherwise formed in the wall of the tank and incorporates a simple press fit knockout plug. The emergency drain device is mounted on the tank by mechanically coupling it to the port. When fully coupled, the device of the subject invention displaces the knockout plug from the boss to provide a means of draining the tank.

As disclosed, the safety device has incorporated within its housing elements to automatically limit the outflow rate of fluid from the tank to a value that ensures sufficient replacement fluid can simultaneously enter the tank and prevent the development of excessive vacuum therein. The device thereby protects the tank from collapse during evacuation. Additionally, the device has provisions for introducing pressurized replacement fluid to the tank to avoid the buildup of any significant vacuum. The drain device includes means to limit the pressure of any replacement fluid to avoid accidental overpressurization of the tank and thereby prevent damage to the tank and risk of harm to personnel or other bystanders, as well as to adjacent property. Another important benefit afforded by the invention is that it enables the convenient use of inert gas as a replacement fluid as the tank is being evacuated. An inert gas, such as nitrogen, can prevent gasoline or other explosive vapors from mixing with air and creating a dangerous explosive mixture in the tank.

The disclosed safety device is relatively inexpensive to manufacture and rugged in construction. Installation of the device is simple and straightforward and does not require special skills or tools. The disclosed port structure is readily incorporated in conventional vessel wall constructions at relatively small cost. Accordingly, the device lends itself to practical use in many commercial operations where hazardous fluids are handled.

DESCRIPTION OF THE PREFERRED EMBODIMENT

Figure 1:
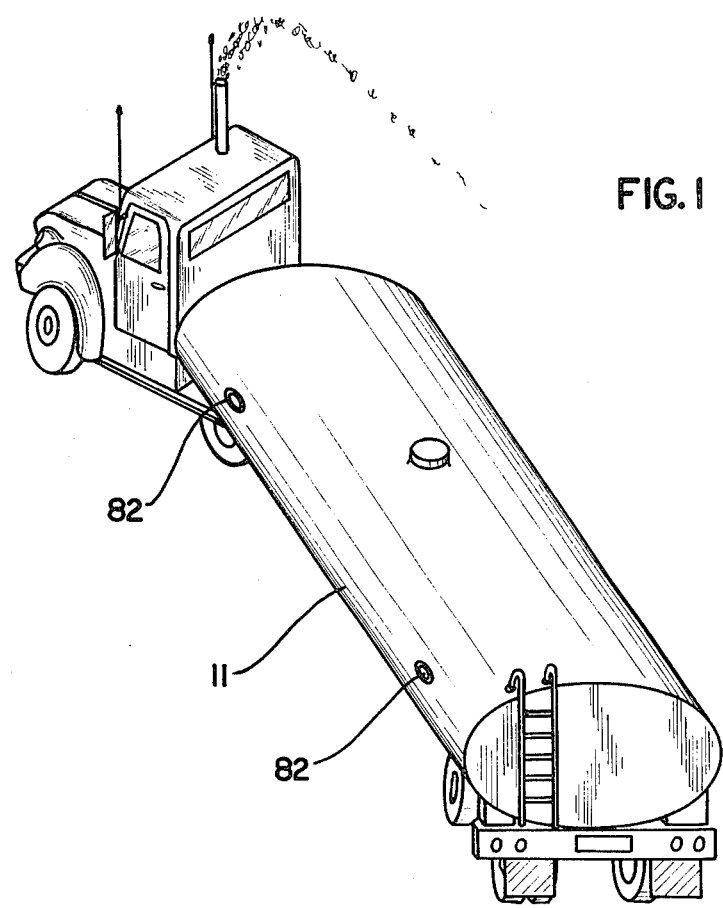
FIG. 1 is a perspective, schematic view of the tank truck with which the present invention is employed.
Figure 4:
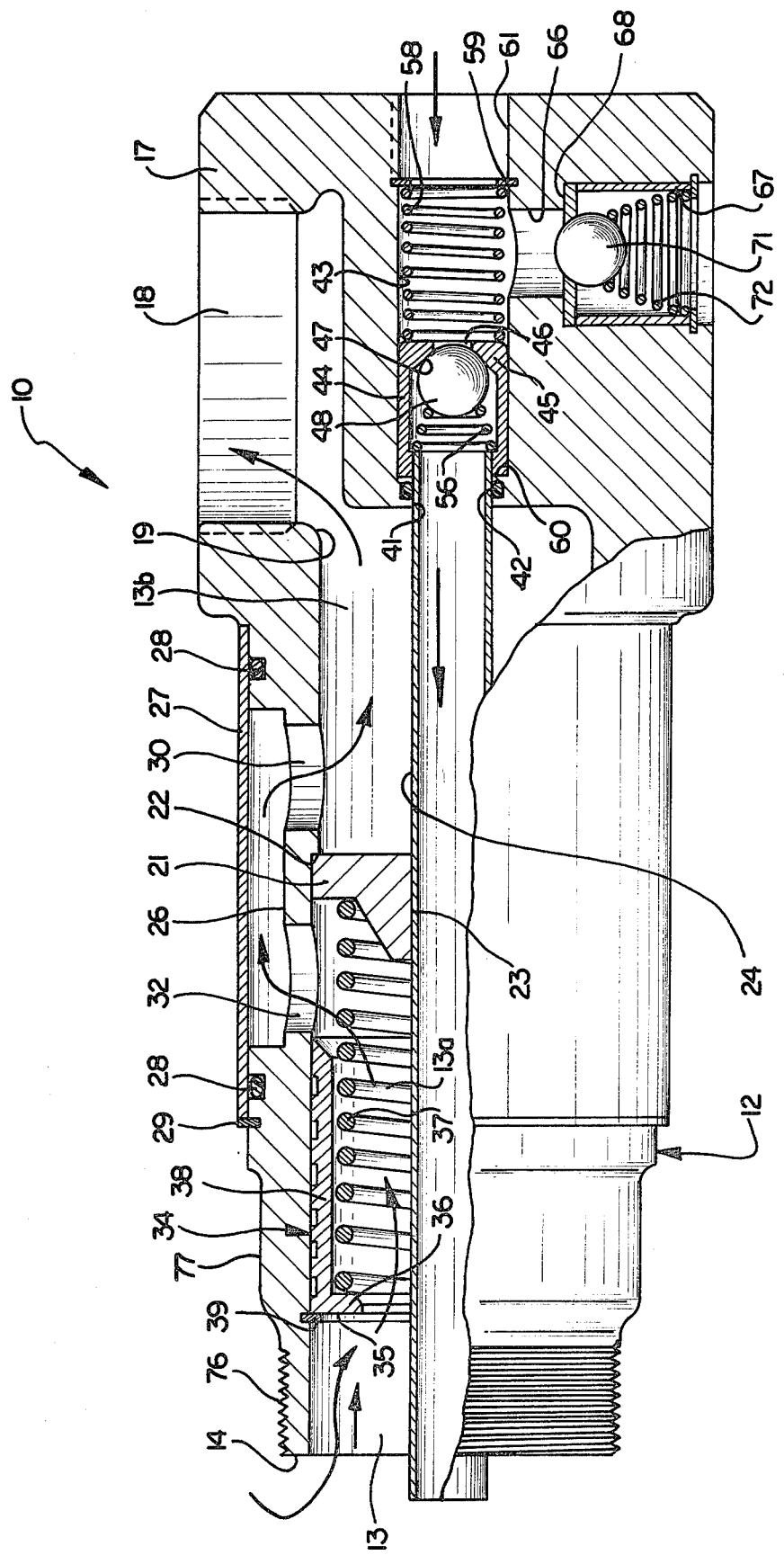
FIG. 4 is a cross-sectional view of the emergency drain device of the invention.

An emergency drain device 10 illustrated in FIG. 4 is adapted to be used in a manner described hereinbelow to evacuate a vessel carrying a potentially hazardous fluid in case of an emergency or other special circumstance where a normal or conventional discharge system cannot be used. Such a vessel is represented by the tank truck 11 of FIG. 1, which has a limited vacuum capacity of, for example, 10 psi below atmospheric pressure, beyond which it can be expected to collapse. The device 10 (FIG. 4) includes a primarily round, hollow housing body 12 machined or otherwise formed of steel, aluminum, brass or suitable like material. A main cylindrical outlet flow passage 13 extends axially from a front end face 14 rearwardly to a head portion 17 forming the rearward end of the housing body 10. A port 18 in the housing head 17 extends radially of the axis of the main passage 13 and is in direct communication with such passage through a throat area 19. The radial or side port 18 is internally threaded for mechanically coupling with a shut-off valve and/or conduit leading to a provisional receiving tank.

An annular metal wall 21 is assembled in the main passage 13 against an annular radial shoulder 22 formed between forward and rearward areas 13a and 13b, respectively, of the main passage 13. The annular wall 21 includes a central cylindrical bore 23 in which an elongated tube 24 is slidably disposed. The passage areas 13a, 13b are thus seen to be directly blocked from each other by the wall 21.

The exterior of a midsection of the housing body 12 is formed with an annular relief or groove 26 generally axially centered about the plane of the metal wall 21. The relief 26 is surrounded by a cylindrical sleeve 27. The sleeve 27, which is sealed on the exterior of the housing body 12 by axially spaced O-rings 28 and axially retained against the housing head 17 by a split snap ring 29, cooperates with the relief 26 to form an annular passage 31 that axially bridges the wall 21. A first circumferentially spaced series of radial ports 32 through the housing wall afford communication between the forward housing passage 13a and the annular passage 31. Similarly, a second series of circumferentially spaced ports 30 afford communication between the annular passage 31 and rearward passage 13b.

Disposed in the forward passage 13a with a close tolerance fit is a spool 34. As shown, the spool 34 is generally cup-shaped, having its end wall 35 disposed towards the housing end face 14. The spool end wall 35 is provided with a central circular orifice 36. The spool 34 is biased toward the forward end face 14 by a helical compression spring 37 which extends along substantially the full length of a skirt section 38 of the spool 34, as well as along the space between the spool and the barrier wall 21 against which it is butted. Forward axial movement of the spool 34 beyond the position illustrated in FIG. 4 is restricted by an internal split ring 39.

As will be understood and later discussed, the outflow of fluid through the device 10 passes serially through the space bounded by the forward portion 13a of the housing passage 13, the spool orifice 36 and the interior of the spool skirt 38, the ports 32, the annular passage 31, the ports 30, the rearward portion 13b of the passage, the throat 19, and finally, the head port 18.

In addition to being slidably disposed in the wall 21, the tube 24 is slidably disposed in a short housing bore 41. An O-ring 42 disposed in this bore 41 provides a linear fluidtight seal on the outside diameter of the tube 24. The rearward end of the tube 24 is received in a cylindrical bore 43 coaxial with the passage 13. As indicated, the bore 43 is somewhat smaller in diameter than the diameter of the main passage 13. Permanently attached and sealed to the rearward end of the tube 24, as by welding or other suitable means, is a cup-shaped body 44. An end wall 45 of the body 44 is produced with an aperture 46 surrounded by a conical surface 47 that forms a seat for a flow check valve ball 48. The ball 48 is biased against the seat 47 to close the aperture 46 by a compression spring 56 in the cavity of the body 44. The force of the spring 56 is relatively light and ordinarily, in most cases, need only balance the weight of the ball 48.

The tube 24 is biased to the position illustrated in FIG. 4 by a helical compression spring 58 disposed in the bore 43. The spring 58 is retained in the bore 43 by a split ring 59. Movement of the tube 24 in a forward direction, i.e., to the left in FIG. 4, is limited by engagement of the cup 44 with an end wall 60 of the bore 43. The rearward end of the bore 43 is internally threaded at 61 and forms a receiving port for a supply of replacement fluid.

Communicating directly with the passage of the bore 43 is a pressure relief vent in the form of a radial bore 66 intersecting such passage. A counterbore 67 communicates with the radial bore 66 and is adapted to connect it to the atmosphere where it opens through the wall of the housing head 17. At the base of the counterbore 67 a washer 68 forms a seat for a valve ball 71. The valve ball 71 is biased against the washer 68 by a helical compression spring 72. The spring 72 is calibrated to retain the valve ball 71 closed against the washer seat 68 until a predetermined pressure is reached in the passage 43, at which point the valve ball is caused to open and thereby limit pressure in the passage. The space bounded by the passage 43, the interior of the cup 44, and the interior of the tube 24 comprises the inlet flow path or passage of the device 10 for conducting replacement fluid to the interior of the tank.

Figure 2:
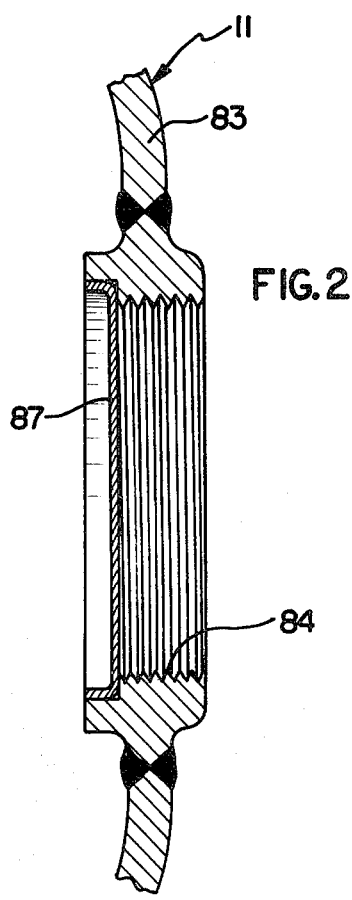
FIG. 2 is an enlarged, cross-sectional, fragmentary view of a port area formed in the wall of the tank of the truck of FIG. 1.

A forward portion of the housing body 12 is externally threaded at 76. In the illustrated case, the threads 76 are shown as self-sealing, tapered pipe threads but, where desired, may be straight threads supplemented with a seal such as an O-ring. An external area 77 of the housing 12 immediately adjacent the threads 76 and/or the exterior of the housing head 17 is square or hexagonal in transverse section to permit the housing to be forcibly rotated with a conventional wrench. In FIG. 2, there is shown a typical port 82 to which the device 10 is adapted to be mechanically coupled. The port, in the illustrated case, is a circular boss circumferentially welded onto a wall 83 of the tank 11 depicted in FIG. 1. Ordinarily, a port boss 82 is formed of the same metal as that of the tank wall 83. One or more of the ports 82 is welded onto the tank 11 at strategic points which can be expected to be accessible in the event of a mishap such as an accident in which the tank truck overturns. For installation of the device 10, a port 82 is selected that is at or adjacent a lowermost area of the tank 11 so that gravity can be relied upon to drive the hazardous fluid from the tank through the port 82.

On its exterior side, the port boss 82 is internally formed with threads 84 adapted to mate with the threads 76 on the forward nipple portion of the housing body 12. On its interior side, the port boss 82 is formed with a smooth cylindrical bore 85. A plug in the form of a stamped sheet metal cup 87 is normally retained in the bore 85 with a moderate press fit. The fit of the cup plug 87 is sufficient to develop a fluidtight metal-to-metal seal between it and the bore 85 of the boss 82.

When an emergency or other event occurs and it is necessary to evacuate the tank 11 through a port 82, the drain device 10 is employed by turning the threaded nipple portion 76 of the housing body 12 into the port boss 82. The threaded length of the nipple 76 is dimensioned such that when it is fully engaged with the threads 84 of the boss 82, the nipple end face 14 completely ejects the cup plug 87 from the bore 85. The axial length of the threads 84 in the boss 82 is sufficient to ensure that the device 10 is safely coupled with the boss before any dislodgement of the plug 87 is initiated.

Figure 3:
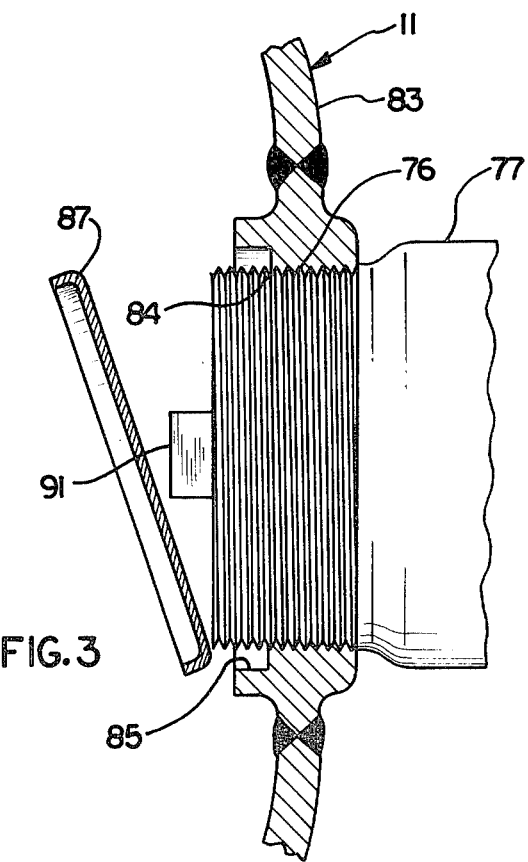
FIG. 3 is a view similar to FIG. 2 illustrating the port area in coupled relation with a forward portion of the emergency drain device of the invention.

Engagement of a forward end 91 of the tube 24 with the plug 87 causes the tube to retract relative to the housing body 12 and increase compression in the spring 58. The spring permits the tube 24 to retract until its lead end 91 is coplanar with the end face 14 of the nipple 76 so that there is no major compressive force on the tube 24 during ejection of the plug 87 by the nipple end face 14. When the plug 87 is ejected, the spring 58 causes the tube 24 to automatically extend a moderate distance beyond the end face 14 of the nipple 76 to the condition illustrated in FIG. 3. This extension of the tube 24 promotes efficient countercurrent of outflow of hazardous fluid and inflow of replacement fluid, as indicated by the arrows in FIG. 4.

The spool 34 functions to limit or control outflow of product to a level which can be balanced by replacement fluid flow, and thereby prevent a buildup of potentially harmful vacuum in the tank 11. Excess vacuum in the tank 11 can result in a collapse of the tank and damage which would exceed that which might have been sustained in the original mishap. The spool 34 accomplishes this regulating function by shifting rearwardly (to the right in FIG. 4) to thereby restrict the area of the ports 32 with its skirt 38. The force operative on the spool 34 to restrict the ports 32 is developed by a pressure differential across the front and rear faces of the spool resulting from flow through the orifice 36 and, as such, is independent of the pressure or head of liquid in the tank. This pressure force is compensated by the spring 37. The spring 37 and orifice 36 are calibrated with respect to the air flow capacity of the inlet passage when the housing inlet passage port 43 is exposed to the atmosphere. For example, the orifice 36 and spring 37 are sized to limit outflow to a rate which will not result in a buildup of a vacuum in the tank 11 in excess of 2.5 psi. The emergency drain device 10 can also be used with a replacement fluid supplied at a pressure above normal atmospheric pressure. This technique can be used to avoid any appreciable development of a vacuum in the tank 11 and can eliminate the risk of an explosive mixture resulting from introduction of air into the tank when the replacement fluid is, for example, an inert gas such as nitrogen. In this procedure, the source of pressurized replacement fluid is connected to the threaded area 61 on the inlet passage 43 with a fitting complementary to the threads. The relief valve ball 71 has its spring 72 calibrated to vent this pressurized replacement fluid where its pressure exceeds a safe value determined by the strength of the tank 11.

The valve ball 48 operates as a check valve to permit the inflow of replacement fluid with a minimum restriction to such flow. The valve 48 prevents reverse flow, i.e., outflow of hazardous fluid, as might result when the pressure in the tank is greater than the pressure in the passage 43.

While the invention has been shown and described with respect to a specific embodiment thereof, this is intended for the purpose of illustration rather than limitation and other variations and modifications of the specific device herein shown and described will be apparent to those skilled in the art, all within the intended spirit and scope of the invention. Accordingly, the patent is not to be limited in scope and effect to the specific embodiment herein shown and described, nor in any other way that is inconsistent with the extent to which the progress in the art has been advanced by the invention.

What is claimed is:

1. A device for emergency draining of fluid from a tank having a limited vacuum capacity comprising a body, means for coupling the body to the tank in a fluidtight manner, an outlet flow passage in the body for discharging liquids from the tank, an inlet flow passage in the body for admitting air into the tank through a path from a zone external of the tank and separate from the outlet flow passage to limit the buildup of the vacuum in the tank, flow control means for limiting the flow rate of liquid from the tank, said flow control means having a predetermined relationship with the flow capacity of the inlet flow passage whereby a sufficient flow of gas existing at atmospheric pressure at the inlet passage is developed for replacing the volume of liquid flowing out of the tank without a buildup of an excessive vacuum in the tank.

2. In combination, a tank for holding a potentially hazardous fluid, a port on the tank, plug means normally closing the port, a device for draining the tank in a controlled leak-free manner in the event of an emergency, mechanical coupling means for releasably coupling the device to the tank, said device including a housing, an outlet passage in said housing for conducting fluid held in the tank through the port to the exterior of the tank, an inlet passage in the housing separate from said outlet passage for admitting replacement fluid through a path from a zone external of the tank into the tank to replace the volume of hazardous fluid conducted through the outlet passage, said device including means for opening said plug at said port subsequent to effectuation of coupling between said tank and said device.

3. The combination as set forth in claim 2, including flow control means associated with said outlet flow passage, said flow control means being calibrated with respect to the flow capacity of said inlet flow passage such that the outflow rate is limited to a value which allows passage of sufficient replacement fluid to avoid buildup of a destructive vacuum in the tank.

4. The combination as set forth in claim 2, wherein said inlet and outlet passages include portions which are concentric with one another.

5. The combination as set forth in claim 4, wherein said outlet passage is concentrically disposed about said inlet passage, said outlet passage including a forward nipple portion having a leading face, said leading face being adapted to engage said plug and displace it out of the port towards the interior of the tank when the housing is substantially fully coupled with the port.

6. The combination as set forth in claim 5, wherein said inlet passage includes a conduit which is received in said housing rearwardly of said leading face and is extendable beyond said leading face when said plug is displaced from said port.

7. An emergency drain valve unit for evacuating a tank of hazardous fluid comprising a housing, a forward end of the housing having an externally threaded nipple portion adapted to be coupled to an internally threaded port on the wall of the tank, an outlet flow passage in the housing extending axially along the nipple portion, means to connect a downstream end of the flow passage to a conduit, the outlet flow passage including an axial bore, said outlet flow passage including a radial port area on the surface of said axial bore, a flow control spool slidably disposed in the port area of the bore for limiting the rate of outflow of hazardous fluid from the tank, said spool including an orifice of predetermined size through which the outflow passes, means biasing the spool in a direction opposite the axial direction of outflow in the bore, the pressure drop across said orifice forming a differential pressure on the opposite face of the spool which results in a net force opposing said biasing means, the spool being adapted to modulate outflow by restricting the radial port area in the bore when flow through the orifice develops a net force exceeding said biasing means, an inlet passage for admitting replacement fluid into the tank, a check valve in the inlet passage to prevent outflow of fluid through said inlet passage, means for coupling a source of fluid pressure above normal atmospheric pressure to said inlet passage, relief valve means communicating with said inlet passage and adapted to prevent inadvertent overpressurization of said tank, said inlet passage including a conduit concentrically disposed in said bore, said conduit having a forward end and being slidably disposed in said housing between a retracted position at or rearward of said nipple face end and an extended position forward of said nipple face end.

8. A method of draining a tank in the event of an emergency comprising the steps of fitting the tank with a provisional drain port which includes an aperture sealed with a plug that is press-fitted in the port, when an emergency occurs, coupling a drain control device on the port by interengaging complementary screw threads, using progressive interengagement of the screw threads coupling the control device to the port to drive the plug from the aperture in the tank, providing the control device with separate outlet and inlet flow paths, allowing hazardous fluid to flow out of the tank through the aperture and outlet flow path of the control device and replacement fluid to flow into the tank through the inlet flow path of the control device and aperture, providing the flow control device with a flow control valve means calibrated with respect to the flow capacity of the inlet flow path for replacement fluid to prevent an excessive rate of outflow of hazardous fluid and a consequent buildup of an excessive vacuum in the tank.

9. A method as set forth in claim 8, wherein said control device is provided with means for coupling a pressurized supply of replacement fluid to the tank.

10. A method as set forth in claim 9, wherein said control device is provided with pressure relief means for limiting the pressure which can be applied by said pressurized supply to said tank.

* * * * *